Nov. 28, 1944.  G. F. WALES  2,364,011
PUNCHING MACHINE
Filed Feb. 25, 1943   5 Sheets-Sheet 1

INVENTOR
George F. Wales
BY
Parker Prochnow Farmer
ATTORNEYS

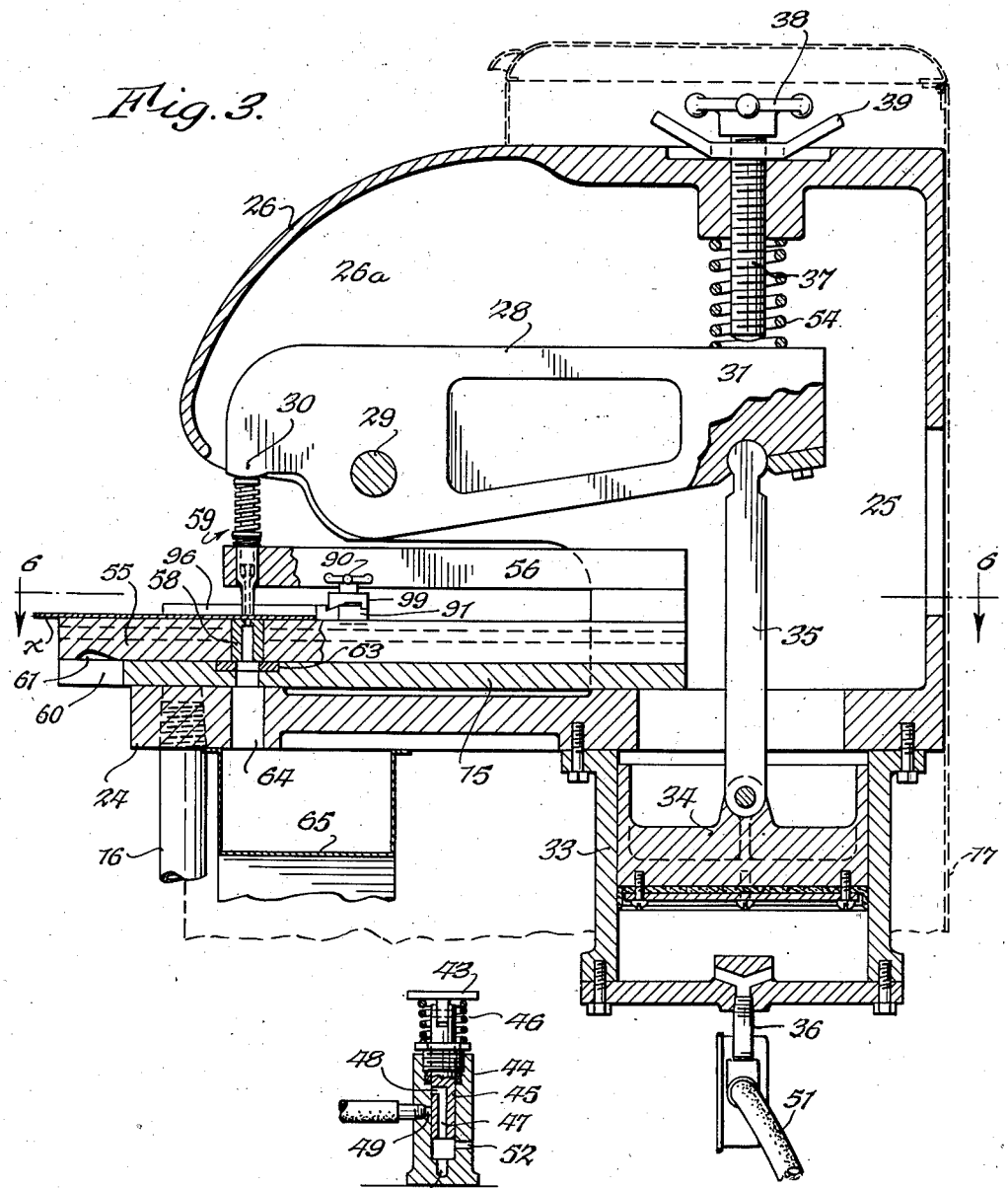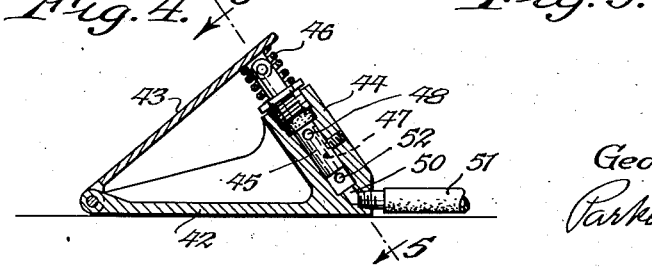

Nov. 28, 1944.  G. F. WALES  2,364,011
PUNCHING MACHINE
Filed Feb. 25, 1943  5 Sheets-Sheet 3
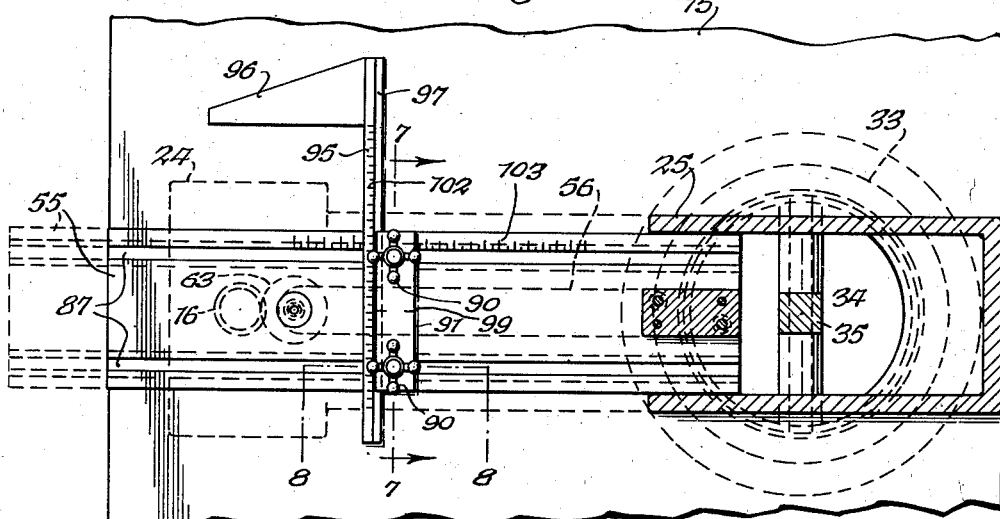
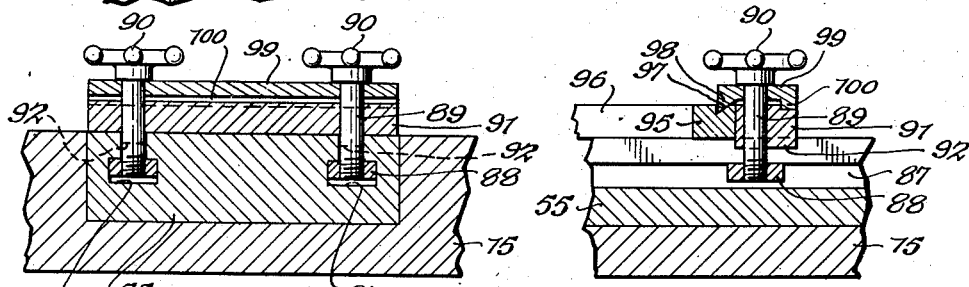
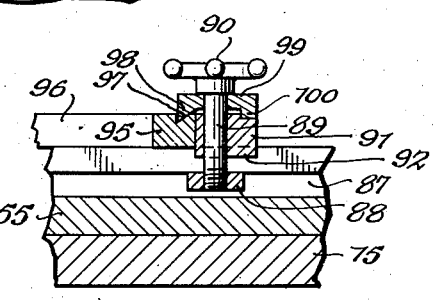
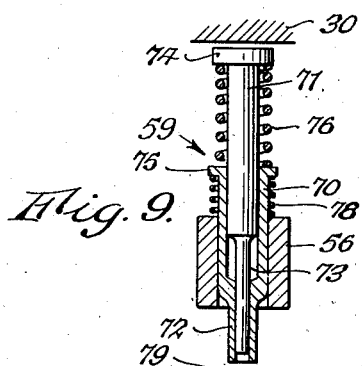
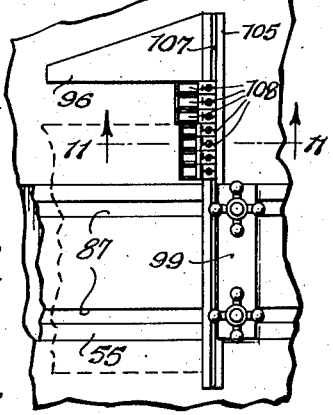
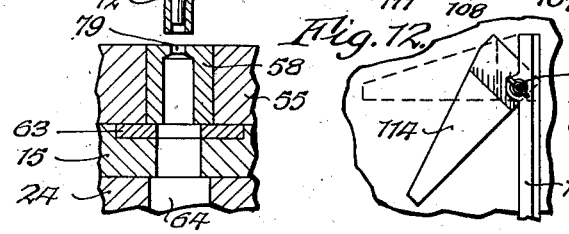
INVENTOR
George F. Wales
BY Parker, Crochran & Parmer
ATTORNEYS Nov. 28, 1944.  G. F. WALES  2,364,011
PUNCHING MACHINE
Filed Feb. 25, 1943  5 Sheets-Sheet 4

INVENTOR
George F. Wales
BY Parker, Prochnow & Farmer
ATTORNEYS

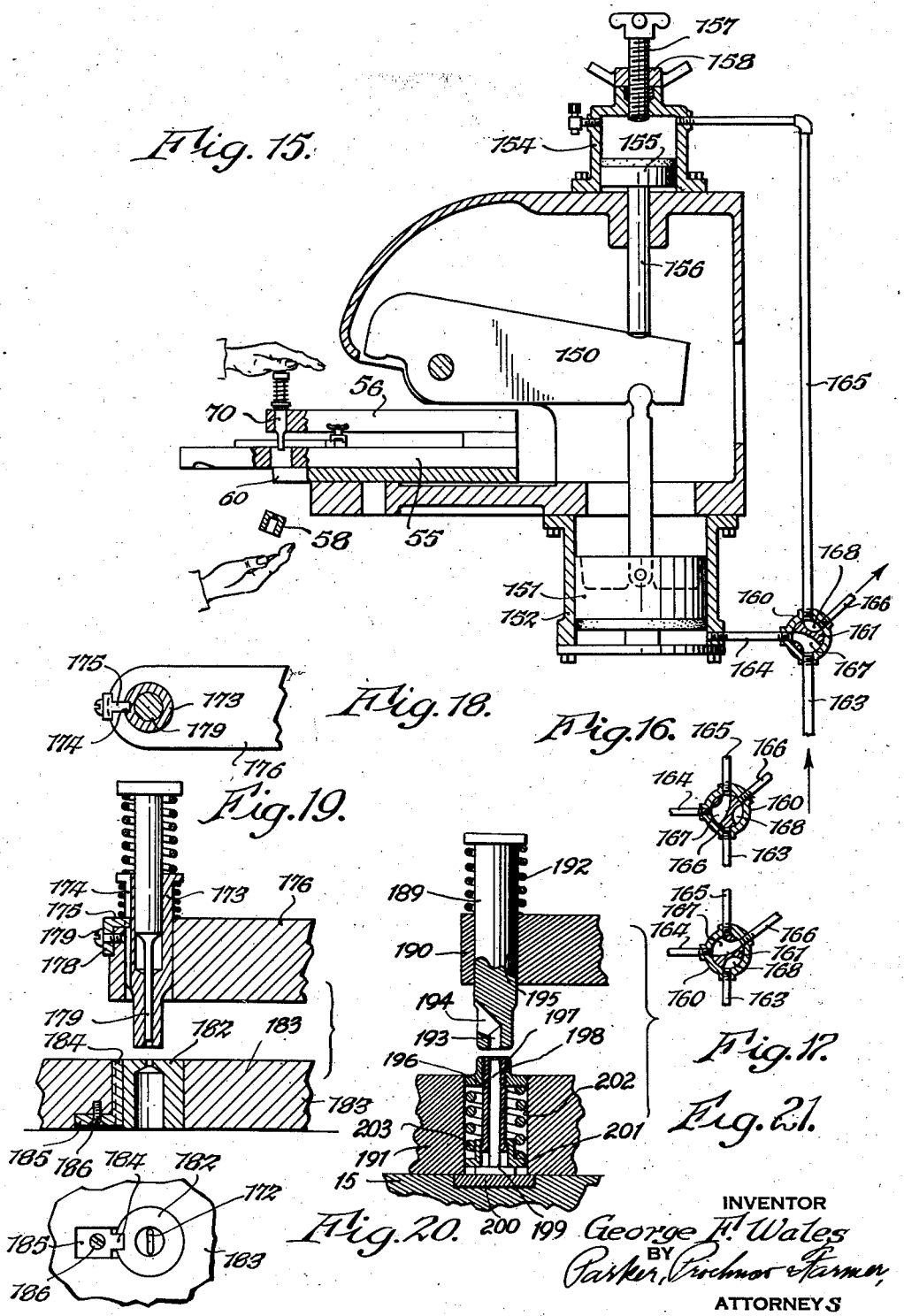

Patented Nov. 28, 1944

2,364,011

UNITED STATES PATENT OFFICE 2,364,011

PUNCHING MACHINE

George F. Wales, Kenmore, N. Y.

Application February 25, 1943, Serial No. 477,070

38 Claims. (Cl. 164—96)

This invention relates to power actuated punching machines for punching holes in sheets of metal and other material.

One of the objects of this invention is to provide a machine of this kind of improved and simplified construction, and by means of which holes of various sizes and shapes can be readily punched in the work. It is also an object of this invention to provide a machine of this kind in which the punch and die units can be quickly and easily inserted and removed to enable the machine to punch holes of different shapes and diameters and in work of different thickness. A further object is to provide a machine of this kind with a holder on which both the punch and die are mounted, and which can be easily moved into operative relation to the power actuated mechanism of the machine, and into another position in which the punch and die units can be easily removed from the holder and replaced by other punch and die units. A further object of this invention is to provide a machine of this kind with gage or stop means of improved construction for use in positioning the work in the desired relation to the perforating elements.

It is also an object of this invention to provide a machine of this type in which there is sufficient space between the perforating units and between the parts of the holder supporting the same, so that the machine may operate on formed or shaped work, such as angle bars or the like.

It is also an object of this invention to provide a machine of this kind with means whereby the punch and die units can be quickly changed and replaced by others without requiring the operator to use any tools or implements other than his hands, and in which the punches and dies will be securely held in proper axial alinement with each other when in their operative positions. It is also an object of this invention to provide an improved and simplified method of removing the die unit from its holder and inserting another die unit in its place.

A further object of this invention is to provide a machine of this type which is so constructed that a large amount of work can be produced by an operator without experiencing fatigue.

Another object of this invention is to provide a punching machine of improved construction for use with a holder on which the punch and die units can readily be removed and replaced. A further object is to provide a holder for a machine of this type in which the punch and die units are held in correct axial alinement with each other and in which the force required for perforating the work is not transmitted to the holder. Another object is to provide a punching machine with a holder having a die slidably mounted in the base of the holder so that when the holder is in operative position, the force exerted on the die by the punch is transmitted to the bed of the press, and when the holder is in an inoperative position, the die may be slid out of engagement with its holder.

Other objects and advantages of this invention will be apparent from the following description and claims.

In the accompanying drawings:

Fig. 3 is a fragmentary longitudinal central sectional elevation of my improved punching machine.

Fig. 4 is a longitudinal sectional view of a valve for operating a fluid actuating mechanism for the punching machine.

Fig. 5 is a sectional view thereof, on line 5—5, Fig. 4.

Fig. 6 is a fragmentary sectional plan view, on line 6—6, Fig. 3.

Fig. 7 is a fragmentary transverse sectional elevation, on line 7—7, Fig. 6.

Fig. 8 is a fragmentary longitudinal sectional elevation, on line 8—8, Fig. 6.

Fig. 9 is a fragmentary transverse sectional central elevation on an enlarged scale through the punch and die units of my improved machine.

Fig. 10 is a fragmentary top plan view of a gage or stop device of modified construction for use in connection with the positioning of work to be perforated, relatively to the perforating devices.

Fig. 11 is a fragmentary sectional elevation thereof, on line 11—11, Fig. 10.

Fig. 12 is a fragmentary top plan view of a gage or device of modified construction.

Fig. 15 is a sectional elevation of the upper portion of a punching machine of another modified construction.

Figs. 16 and 17 are sectional views of a control valve by means of which fluid under pressure is passed to the two pistons of the punching machine shown in Fig. 15.

Fig. 18 is a fragmentary sectional top plan view of the front portion of a holder of modified construction for use in punching non-circular holes.

Fig. 19 is a fragmentary longitudinal central sectional elevation thereof.

Fig. 20 is a fragmentary bottom plan view thereof.

Fig. 21 is a fragmentary longitudinal central sectional elevation of a holder of modified construction showing the punch and die elements in inverted position, with the die element in the upper arm and the removable punch in the lower arm of the holder.

Figure 1:
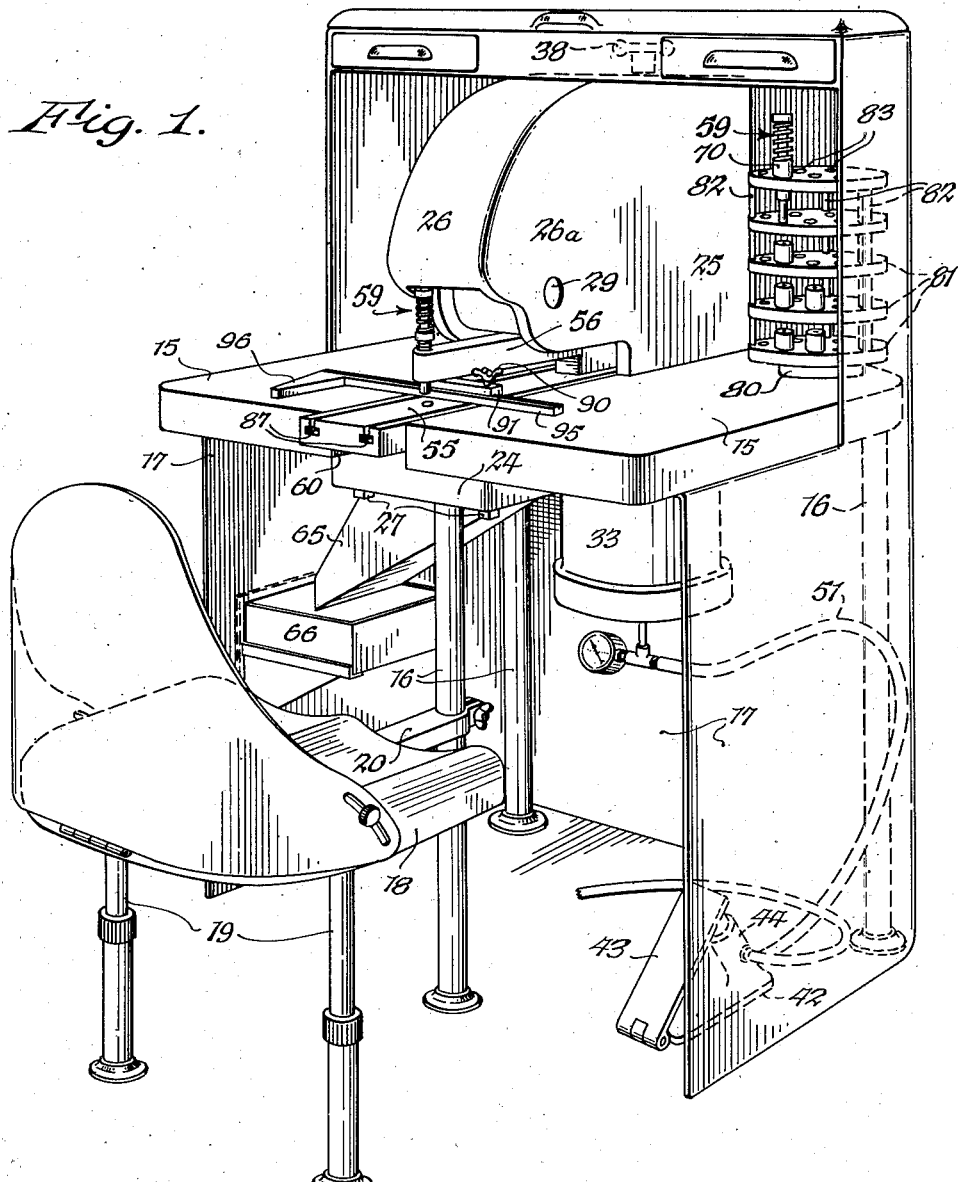
Fig. 1 is a perspective view of a punching machine embodying this invention.
Figure 2:
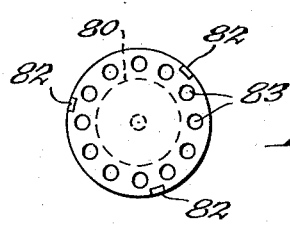
Fig. 2 is a top plan view of the rack for supporting the punches and dies for use on the machine.

In the particular embodiment of my invention shown in Figs. 1 to 12, the punching machine includes a table top or plate 15 on which the parts of the machine are mounted, the table top being supported from the floor by legs 16 and having side and rear walls or panels 17. The rear portions of these walls or panels may extend upwardly above the table top to enclose the upper rear portion of the machine. The table top is preferably supported above the floor at a convenient height so that an operator can easily handle the work and change punches and dies as will be hereinafter described, while the operator is seated on a chair 18 having upright legs 19 adjustable to vary the height of the chair. Preferably the chair is also partly supported on one of the legs 16 of the table, for example, by a bar 20 secured to the chair seat and adjustably clamped to the table leg. A table of other construction may be employed, if desired.

Any suitable type of power actuated press may be provided and mounted on the table to become a permanent part thereof. In the construction shown in Figs. 1 to 12, the press includes a stationary frame or housing mounted on the table, the housing comprising a bed 24 which may be secured to the lower face of the table and which has an upwardly extending part 25 at the rear thereof. This upwardly extending housing part terminates in a forwardly extending upper housing part 26 extending over the bed 24. The press housing may be mounted on the table 15 in any suitable or desired manner, and in the construction illustrated the rear portion of the table is cut out to receive the upwardly extending part 25 of the press housing and the bed 24 of this press housing is rigidly secured to the underface of the table 15 in any suitable manner, for example, by means of screws 27, Fig. 1. This upper part of the housing is preferably hollow, having side walls 26a which are of sufficient strength to withstand the strains to which this part of the housing is subjected.

The ram of the press may be of any suitable or desired form, and in the construction illustrated by way of example, a lever type of ram 28 is provided which is located in the hollow upper housing part 26 and is pivoted at 29 on the side walls 26a of the upper portion of the press housing. This lever has a forwardly extending short arm terminating in a tool engaging part 30 and a longer rearwardly extending arm 31 which is moved upwardly about the pivot 29 to produce the working stroke of the ram. Any suitable or desired means may be employed to produce motion of the ram or lever 28, and in the construction illustrated, a fluid operated mechanism is used for this purpose which may, for example, include a cylinder 33 secured to the bed 24 of the press housing or frame and in which a piston 34 is arranged, the piston being connected by means of a link 35 with the longer arm 31 of the lever or ram 28. It will be obvious that when fluid under pressure, such for example as compressed air, is admitted to the lower portion of the cylinder 33, for example, by means of an inlet duct 36, the piston 34 will be moved upwardly so that the tool actuating part 30 of the lever will move the tool downwardly through its working stroke. When the fluid pressure is relieved in the cylinder 33, the piston 34 may be returned to its lower position by gravity or by any other suitable means.

In order to limit the extent of movement of the ram and the piston 34, suitable stop means may be provided. In the construction shown, I provide means which limit the upward movement of the lever arm 31 of the ram, such, for example, as an adjustable stop screw 37 having a threaded engagement in the upper part of the press housing and provided with a hand knob or wheel 38 at the upper end thereof, and preferably a lock nut 39 is also provided to hold the stop screw in the desired position.

Any suitable or desired control valve may be provided for admitting fluid under pressure to the cylinder 33. Preferably this valve is controlled by the foot of the operator, and is, consequently, located on the floor on which the punching machine rests. A valve suitable for this purpose is illustrated in Figs. 1, 4 and 5 and includes a base 42 having a treadle 43 pivotally mounted thereon. The base 42 also has a valve housing 44 formed thereon in which a movable valve member 45 is slidably arranged. This valve member is connected to the treadle 43 and a spring 46 normally holds the valve in its outer position in which the flow of compressed fluid to the cylinder 33 is interrupted, and in which the fluid in the cylinder is exhausted or discharged. The particular valve illustrated is intended for use for compressed air, but it may be obvious that any other fluid may be provided for actuating the piston 34. As shown in Fig. 5, the valve 45 is provided with a central part or passage 47 opening at its lower end at the lower face of the valve and having a lateral passage 48 adapted to connect with a supply of compressed air or other fluid entering the valve housing through an inlet passage 49. The valve housing also has a passage 50 in the lower portion thereof, which connects with a duct 51, which in turn is connected with the inlet pipe 36. The valve housing also has an exhaust passage 52 leading to the atmosphere when compressed air is employed as the motive fluid.

From the foregoing description, it will be obvious that when the foot treadle 43 is depressed, the valve 45 will be moved downwardly so that a portion thereof extends across and shuts off the exhaust passage 52 while the transverse inlet passage 48 of the valve moves into registration with the inlet passage 49 of the valve housing so that compressed air flows through the interior of the valve through the discharge port or passage 50 to the head of the cylinder 33. When foot pressure is removed from the treadle 43 the valve 45 is moved by the spring 46 back to the positions shown in Figs. 4 and 5, thus shutting off the admission of fluid under pressure and connecting the duct 50 with the exhaust port 52 in the valve housing. Any other suitable means for actuating the ram of the press and any desired means for controlling the operation of the ram may be provided.

Because of the weight of the piston and the long arm of the lever type ram, these parts will return by gravity to their inoperative positions when the fluid is exhausted from the piston 33. If desired, means for returning the parts may, however, be provided, such for example as a return spring 54 arranged about the stop screw 37.

The punch and die units for perforating the work X are mounted in operative relation to each other on a holder which is movable into and out of operative relation to the ram of the press. In the construction illustrated by way of example, this holder includes a base 55 which is suitably supported on the bed of the press, and an arm 56 which is rigidly secured at the rear end thereof to the base 55 of the holder in such a manner that the arm throughout the greater portion of its length is arranged in fixed spaced relation to the base, so that work to be perforated may be inserted between the base 55 and arm 56 of the holder. The arms may be spaced from each other at any desired distance to accommodate not only flat work but also work of angle-shaped cross section or other formed work.

The base and arm of the holder are provided with accurately alined guide means arranged to receive the perforating units. In the particular construction shown by way of example, these guide means are in the form of accurately alined holes formed in the base and arm of the holder, and a die unit 58 is mounted in the hole formed in the base of the holder and a combined punch and stripper unit 59 is mounted in a hole in the arm 56. Since the holes are formed in the holder in axial alinement with each other, it follows that the punch and die will be in axial alinement with each other when placed into their operative positions in the holes of the base and arm. It will be understood that this is merely illustrative of one embodiment of my invention, since if desired, the punch unit may be arranged in a hole in the base, and the die unit in the hole of the arm 56, as illustrated in my Patent No. 2,319,568 of May 18, 1943, or as shown in Fig. 21.

The holder may be movably mounted on the machine in any suitable or desired manner. Preferably, the movement of the holder is guided to facilitate the positioning of the holder into and out of operative relation to the ram of the press. This may be accomplished, for example, as illustrated in the drawings, by means of a sliding connection or guideway between the table 15 and the base 55 of the holder. For this purpose, the table is provided with a longitudinally extending groove terminating at the front edge of the table, and in which the base 55 is arranged to slide. Preferably, the upper face of the base is flush with the upper face of the table.

In order to facilitate the sliding of the holder relatively to the table, the front edge of the table at the groove therein is notched or cut back as shown at 60 in Figs. 1 and 3, and the lower face of the base 55 of the holder is provided with a recess or hand hole 61 by means of which the operator may grasp the base of the holder and slide the holder forwardly from the rear or operative position of the same as shown in Fig. 3. Fig. 1 shows this holder partly slid forwardly.

The movable arrangement of the holder relatively to the table is mainly for the purpose of making it possible to quickly change the punch and die units to adapt the machine for punching holes of different sizes or in materials of different thicknesses. For this purpose, the die 58 is slidably mounted in the base, for example, in a hole therein, and is held in place on the base only by resting on the table 15. For this purpose, the table is preferably provided with an insert or wear plate 63 of hardened material, which is set in a recess in the table 15 so that when pressure is exerted on the die by the punch and stripping means, this pressure is transmitted by the die directly to the wear plate 63 and from this wear plate to the table 15 and bed 24 of the press. The die is provided with a hole extending axially through the same, the upper part of the hole being of a diameter necessary for cooperation with its punch, and the lower part of this hole being of larger diameter and through which the punchings are discharged. The wear plate and table are also provided with holes, preferably somewhat larger than the hole in the die, so that the punchings may pass therethrough and through a hole 64 in the bed 24 of the press housing. If desired, a chute 65 for the punchings may be provided below the hole 64 in the press bed by means of which the punchings are discharged into a receptacle 66 arranged below the table 15.

The punch and stripper assembly 59 is slidably mounted on the arm 56, so as to move toward and from the die in axial alinement therewith and so as to be readily removable from the holders. For example, this assembly may, as shown, include a punch guide sleeve 70, the body portion of which is of such diameter as to have a sliding fit in the hole in the arm 56 of the holder, and the interior of which is bored to provide a sliding fit for a body portion 71 of the punch. If the work penetrating end of the punch is of smaller diameter than the body portion, then the lower portion 72 of the guide sleeve 70 may be reduced in diameter to provide a sliding fit for the lower portion 73 of the punch. A stripper spring is provided to react against the punch and the punch guide sleeve and for this purpose, the upper end of the punch 71 may be provided with an enlargement or head 74 adapted to be engaged by the ram of a press, and the upper end of the guide sleeve may be provided with an enlargement or flange 75, and a stripper spring 76 is, consequently, positioned between the head 74 of the punch and the flange 75 of the punch guide sleeve. The stripper spring is of such length that it normally holds the lower end 73 of the punch within the portion 72 of the guide sleeve as shown in Fig. 9. A lifting spring 78 is preferably provided between the flange 75 of the punch guide sleeve and the arm 56 of the holder, to normally support the punch and guide sleeve in spaced relation to the die to facilitate the insertion of work between the punch and die.

As a result of this construction, when the ram exerts a downward force upon the head 74 of the punch, the lifting spring 78, which is materially lighter than the stripper spring 76, is first compressed so that the lower end of the punch guide sleeve contacts with the upper surface of the work to be perforated. Further downward movement of the punch by the ram compresses the stripper spring 76 and moves the punch downwardly relatively to its guide sleeve and eventually through the work. Upon upward movement of the ram, the stripper spring first expands to move the punch out of the work, the spring also holding the guide sleeve 72 pressed against the work. When the punch has been stripped from the work, the lifting spring 78 moves the guide sleeve and punch together into a raised position, as shown in Fig. 9, in which the work can be easily moved into and out of operative relation to the punch and die.

The lifting spring 78 may be of any desired length to raise the guide sleeve and punch to the desired extent. When the machine is to be used on formed work, angle bars or the like, a lifting spring is selected which is of such length as to lift the guide sleeve and punch to the maximum extent permitted by the upper position of the part 30 of the ram.

It will be noted that with this punch and stripper assembly, the entire assembly can be removed from the arm 56 of the holder by merely lifting the same so that the guide sleeve 70 of the punch slides upwardly out of its hole in the arm 56. It will also be evident from the construction illustrated that by providing guide sleeves 70, all having the same outer diameter, to fit into the hole in the arm 56 and bored to receive punches of different diameters, punches of many different sizes can be used on the same holder. Also dies 58 having the upper portions of the holes 79 of different diameters may be provided to cooperate with the punches.

From the foregoing description, it will be obvious that if the holder is slid forwardly relatively to the table, sufficiently, so that the die 58 will be clear of the table, as shown in Fig. 15, the die can be easily dropped downwardly out of its hole in the base of the holder, for example, by striking the head 74 of the punch with the hand so that the lower end of the guide sleeve 72 strikes the upper face of the die 58 sufficiently to move the same downwardly out of its hole in the holder as is also clearly indicated in Fig. 15. The punch and stripper assembly can then be lifted out of the hole in the arm 56 of the holder, and these two perforating units can then be replaced by others by merely inserting a different punch and stripper assembly into the hole in the arm 56 and by inserting another die 58 upwardly into the hole in the base 55 of the holder. By then sliding the holder back into the operative position shown in Fig. 3, the die will be held in the holder by contact with the table 15. It is merely necessary to slide the holder back into a position in which the head 74 of the punch is in operative relation to the part 30 of the ram. The accurate alinement of the punch and die relatively to each other is taken care of by the accurate formation of holes in the holder and the accurate construction of the die, punch, and guide sleeve. The construction described, consequently, makes it unnecessary to position the holder with great accuracy relatively to the ram of the press, since it is merely necessary to position the holder so that the ram can engage the head 74 of the punch. The structure described also has the advantage that the holder serves only to guide the punch in its movement toward and from the die, and none of the force required for perforating the work and for stripping the punch from the work are transmitted to the holder.

The punch and die elements may be inverted as shown in Fig. 21. In this particular construction, which is shown by way of example, the numeral 15 designates the bed on which holder base 191 is slid in and out of the machine and 200 is the hardened wear plate which takes the thrust of the punch through head 199. The holder is similar to the one shown at 55 and 56 in Fig. 15 and when moved to the position shown in Fig. 15, the loosely assembled punch falls from the device by gravity. As constructed the device illustrated in Fig. 21 consists of a unitary holder having a lower base 191 and an upper arm 190 which is rigidly secured at the rear end thereof to the base 191 of the holder in such manner that the arm throughout the greater portion of its length is arranged in fixed spaced relation to the base so that work to be perforated may be inserted between the base 191 and arm 190 of the holder. The base and arm of the holder are provided with accurately alined guide means arranged to receive the perforating units. In the particular construction shown, these guide means are in the form of accurately aligned holes formed in the base and arm of the holder and a die unit 189 is mounted in the hole 195 formed in the arm of the holder and a combined punch and stripper unit is mounted in a hole 202 in the base 191. Since the holes are formed in the holder in axial alinement with each other, it follows that the punch and die will be in axial alinement with each other when placed into their operative position in the holes of the base and arm.

The die element 189 is slidably mounted on the arm 190 so as to move toward and from the punch in axial alinement therewith and so as to be readily removable from the holders. Die element 180 is held in an upward position by light spring 192 and is provided at its lower end with die opening 193 which terminates in an angular slug discharge opening 194 terminating in the outer surface thereof. The punch assembly includes punch 198 which is provided with a fixed head 199. The stripper and punch guide assembly includes an upper guide member 197 which is guided in hole 202 and a lower guide member 201 which is also guided in hole 202. Joining guide members 197 and 201 is guide sleeve 196 which is immovably fastened to upper guide 197, but telescopically joined to lower member 201. Interposed between members 197 and 201 is a stripper spring 203 which is placed under a strong initial pressure when the stripper unit is assembled. In operating position the thrust on the punch is taken by hardened backing plate 200. In changing the punch and die elements of this construction the holder is moved forward as indicated in Fig. 15 in which position the entire punch and stripping mechanism may be removed from the base as shown in Fig. 15 and the die element may be removed from the upper arm.

In order to make this machine a complete unit by means of which holes of different sizes may be punched in materials of different thicknesses, and in which the work required for changing the punches and dies to suit the requirements is reduced to a minimum, a rack or stand for supporting the punch and stripping units and dies is preferably mounted on the table 15 within easy reach of the operator. A rack or perforating unit support of any suitable or desired construction may be employed and by way of example, I have illustrated in Figs. 1 and 2, a rack in which the supporting shelves are mounted to turn upon a vertical axis. This rack may, for example, have a base 80 resting on the table 15 and a series of shelves 81 secured together and mounted to rotate on the base 80 about a central axis. The shelves 81 may be held against rotation relatively to each other by means of upright bars 82 which connect the shelves. The upper shelf is provided with a series of holes 83 formed to receive the punch guide sleeves 70 of a plurality of punch and stripper units 59. On the three lower shelves, suitable means are provided for supporting a series of dies immediately below each punch and stripper assembly or unit. The upper shelf may be provided at each hole with an index or numeral indicating the diameter of the punch supported in such holes and the dies arranged immediately below such punch may be each adapted to cooperate with the same punch, but for use on material of different thickness. For example, it is well known that the clearance between the punch and die must differ when punching different thicknesses of material. Thus one of the dies arranged below its punch and stripper assembly may have upper portion of the hole 79 therein bored to provide a clearance of .003 inch with the punch for the purpose of punching relatively thin or light gage materials. The die immediately below the upper die may have a clearance with the same punch of approximately .010 inch for punching material of medium thickness, thus approximately 1/8 inch thickness, and the lower die of a vertical series may have a clearance of .020 inch with the same punch for punching heavier materials, for example, up to about 7/8 inch thickness. When the punches and dies in the rack are arranged in vertical tiers, as described, the changing of the punching machine to operate on materials of different thickness and to punch holes of different diameters is very greatly facilitated, since it is merely necessary for the operator to remove from the rack the punch and stripper assembly having a punch of the desired diameter and also to select from the same vertical tier a die suitable for the thickness of the material to be operated upon. Similarly when the machine is to be changed to punch holes of different diameters, the die and the punch and stripper assembly is removed from the holder and positioned in the spaces in the rack which was made vacant by the selection of the particular die and the punch and stripper assembly. By means of this arrangement, the punches and dies must always be returned to their proper positions in the rack and the selection of punches and dies of the desired diameters is greatly facilitated.

It is also desirable to provide my improved punching machine with gage means for facilitating the positioning of the work with reference to the perforating units. This can best be done by mounting the gage means on the holder so that they will remain in fixed relation to the punch and die in all positions of the holder. Gage means of any suitable or desired type may be employed, and in the construction illustrated, I have provided the base 55 of the holder with means for adjustably clamping a stop or gage device thereon. Such means for example may include a pair of T-shaped slots 87 formed in the base 55 and extending lengthwise thereof, and in which nuts 88 may be arranged for cooperation with clamping screws 89 having knobs or hand wheels 90. One clamping screw and nut is provided for each slot in the construction shown, and the clamping screws extend through a guide bar 91 which extends transversely of the base 55, and which is adjustable lengthwise of the base while maintaining a rectangular relation to the slots 87. Preferably, the guide bar is also provided with downwardly extending flanges or parts 92 which extend into the upper portions of the undercut or T-shaped slots 87 so that the guide bar 91 may, when the clamping screws are released, slide lengthwise of the base 55 while retaining the same angular relation thereto.

The guide bar may cooperate with any suitable or desired stop or gage member with which the work may be moved into engagement to correctly position the same with regard to the punch and die units. In the construction shown in Figs. 1, 3, 6, 7, and 8, a gage member is provided having a bar or arm 95 extending crosswise of the base 55 and having another arm 96 arranged at an angle thereto, the angle being preferably a right angle. Means are provided for clamping the gage member to the base of the holder and also into contact with the guide bar so that the gage bar 95 will also extend at right angles to the base. This may, for example be accomplished by providing the transversely extending gage bar 95 with a V-shaped groove 97 formed in the upper face thereof, with which a correspondingly shaped flange 98 of a clamping member or bar 99 may enter. This clamping member 99 is provided at the opposite side thereof with a downwardly extending flange 100 adapted to contact with the guide member 91 and is provided with holes through which the clamping screws 89 pass. It will be clear from Fig. 8 that when the transverse gage bar 95 is arranged in the desired location in the direction of its length and also in the desired location lengthwise of the base 55 of the holder, the gage member will be clamped in such position by tightening the screws 89 and will also be held by the inclined faces in the slot 97 and on the lower face of the flange 98 of the clamping member into engagement with the front face of the guide member 91, and the guide member in turn will be clamped on the base 55. The upper face of the gage bar 95 may be provided with graduations 102 adapted to cooperate with centrally arranged mark on the clamping bar 99, by means of which the location of the arm 96 of the gage member may be readily located with reference to the center of the hole to be formed in the work. Similarly the base of the holder may be provided with graduations 103 by means of which the location of the gage bar 95 from the center of the punch and die may be determined. Any other gage means may be provided for facilitating the positioning of the work relatively to the perforating units.

In Figs. 10 and 11, I have shown a modified form of gage or stop device, which is particularly desirable for use in connection with the punching of a plurality of accurately spaced holes in the work. In this construction, a transverse gage bar 105 is provided which has the upper face thereof provided with a forwardly and downwardly inclined surface 106 with which the lower inclined face of the flange 98 of the clamping member 99 may engage for securing this bar in the desired relation to the base of the holder. The upper face of the gage bar 105 also has an oppositely downwardly inclined surface 104, the surfaces 104 and 106 terminating in an undercut groove 107 which is formed to receive movable gage or stop members which are preferably made of spring material and each has two arms 108 and 110 separated by the looped or bent portion 109 which is formed to enter the undercut groove 107 for holding the gage members frictionally in this groove. The arm 108 rests on the surface 104 of the transverse gage bar 105 and the other arm 110 is normally spaced from the arm 108, as shown in broken lines in Fig. 11, and is provided at its outer end with a gage or stop device for the work. This stop device may, for example, have three sides extending upwardly from a bottom 111, two of the sides 211 being substantially triangular in form, and the third or back side may be integral with the arm 110 and extend downwardly at an angle thereto. These gage devices are so made that the dimension thereof lengthwise of the transverse bar 105, which dimension corresponds with the distance between perforations to be made in the work or the dimensions of two or more of the gage members may correspond to the distance between perforations. One or more of these gage devices are yieldingly mounted on the gage bar 105 and any of them may be moved downwardly by the fingers of the operator into their operative positions, shown in full lines in Fig. 11, in which positions they are held while the work is placed against the gage bar 105 and against the outermost of the stop devices 111. After punching the hole in the work while in this position, the stop device engaged by the work is released, thus permitting it to move into inoperative position, so that the work may be slid under this stop device into engagement with the next stop device which is depressed.

If the stop devices are of a width equal to the distance between holes to be punched, the operator may press one or more of the stop devices downwardly, four of these devices being shown in their lower positions in Fig. 10. The work is then placed into engagement with the outermost of the depressed stop devices and punched. The operator then releases the outermost stop device, moves the work into engagement with the next stop devices and punches the work, etc., until the desired number of holes are punched, the last hole being punched while the work is placed against the fixed arm 96 of the gage bar. If the movable gage devices are not needed, they may be left in their upper positions, in which case, the work can pass under the stop devices 111 thereof and the gage bar 105 and its fixed arm 96 may then be used in the same manner as the gage bar described in connection with the preceding figures. It will, of course, be understood that these movable gage devices are initially moved toward the fixed arm 96 as far as possible, and if the gage devices should inadvertently be moved away from these positions, the moving of the work against the outermost gage device will again move this device and the others toward the arm 96.

Suitable stop means are preferably provided to limit the extent to which the arms 110 may swing upwardly, so that these gage devices will be high enough when in their operative positions to let the work pass under them, and low enough so that they are readily accessible to the fingers of the operator. In the construction shown for this purpose, a screw-threaded stud 215 is secured to the lower arm 108 of each gage device and extends through a hole in the upper arm 110, and a stop nut 216 cooperates with the stud and with the upper arm, so that by adjusting the stop nut, the height of the stop device 111 above the table of the press may be regulated as desired.

In Fig. 12, another modified form of gage member is shown in which a gage bar 112 of the gage member may be positioned as hereinbefore described in connection with the gage bars 95 and 105. This gage bar has an adjustable transverse arm 114 pivotally mounted thereon, which may be secured in adjusted position by means of a clamping bolt 115 so that the gage arm 114 may be swung into different angular positions to cooperate with work of different shapes. The adjustable arm 114 may also be used for forming differently spaced punched holes in the workpiece by first perforating a number of pieces while the arm 114 is in one position, for example, as shown in full lines in Fig. 12, and then changing the position of the gage arm and again positioning the work pieces in engagement with the arm 114 to form other perforations in the work. When the arm 114 is in an angular position, as shown in full lines in Fig. 12, and the work is of rectangular form, only the outer corner of the arm 114 may be used to engage the work. Gage means of other constructions may be employed in connection with my improved punching machine and by securing the gage members to the base 55 of the holder, the gage members will remain in correct relation to the perforating devices, regardless of whether the holder is in its operative position or has been slid forwardly. Consequently, it is possible to secure the gage member in the desired position while the holder is slid forwardly into a position in which the gage member is more readily accessible.

Figure 13:
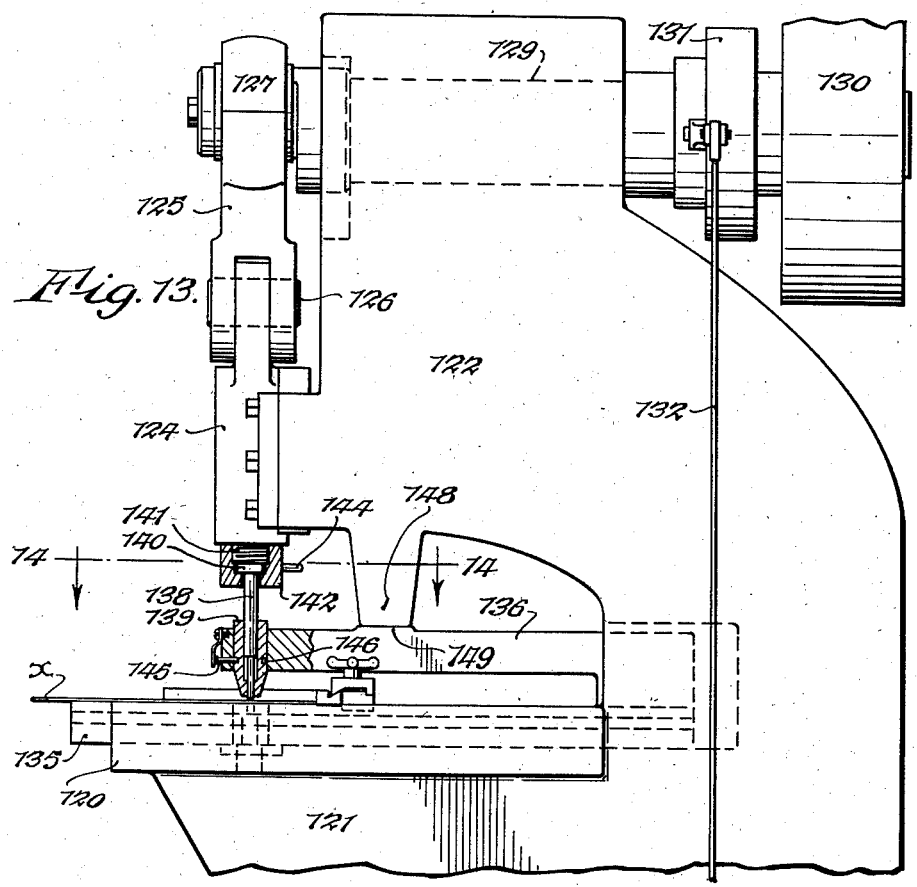
Fig. 13 is a fragmentary elevation of a punching machine of modified construction.
Figure 14:
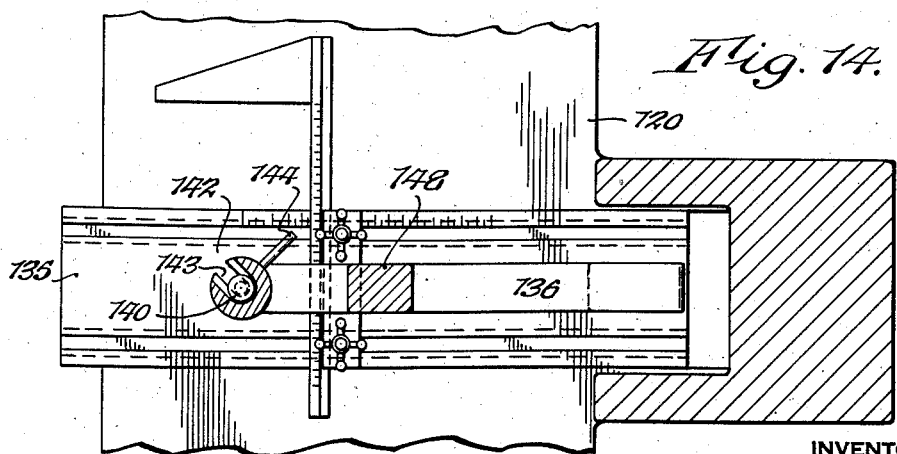
Fig. 14 is a fragmentary top plan view thereof, on line 14—14, Fig. 13.

In Figs. 13 and 14, a modified form of my invention is shown, in which 120 represents the table of the punching machine, and in which the press includes a bed 121 which may, if desired, be made integral with the table, and an upper arm 122 and having a slide or ram 124 mounted on the front end thereof for vertical movement. In this case, the slide may be actuated by means of a connecting link 125 pivotally connected therewith at 126, the connecting link having the upper end 127 thereof journalled on a crank or eccentric formed on a horizontal shaft 129 on which a flywheel 130 may be journalled. This flywheel may also serve as a pulley as is customary in presses of this type and a one-revolution clutch 131 of any suitable construction may be mounted on the shaft to connect the same with the flywheel 130 for one-revolution at a time. The clutch may be actuated by means of a treadle (not shown) as has heretofore been customary in connection with presses of this type, which is connected with the clutch by means of a clutch actuating or shift rod 132.

A holder for the perforating units is provided, which may be of similar construction to the one heretofore described, and which may include a base 135 and an upper arm 136 spaced from the base, the base and arm being provided with accurately alined holes or other guide means for receiving the die and the guide sleeve for the punch. A combined punch and stripper unit, such as shown in Figs. 1, 3 and 9, may be used in connection with the punching machine shown in Figs. 13 and 14 for cooperation with the lower end of the ram 124. I have, however, shown in Figs. 13 and 14, a modified form of punch which may be removably connected with the ram in such a manner that the upward movement of the ram strips the punch from the work. In this construction, the punch 138 is slidable vertically in its guide sleeve 139 and is provided with a head 140 adapted to be rigidly secured in any suitable manner on the lower end of the ram. For example, the lower end of the ram 124 may be provided with a threaded stud or projection 141 engaged by a nut 142 having a T-slot 143 extending inwardly from the periphery, the wider portion of this slot being formed to receive the head 140 of the punch and the narrower portion of which is formed to receive the shank or stem portion of the punch adjacent to the head. The slot is so formed that when it faces toward the front of the machine, the head of the punch may enter the slot when the holder on which the punch and its guide sleeve are supported is slid rearwardly on the table 120. When the head of the punch is substantially centrally positioned in the nut 142, the nut can be turned to clamp the head of the punch between the nut and the lower end of the stud 141 of the ram. To facilitate tightening and releasing of the nut, this nut may, for example, be provided with an outwardly extending arm 144. By means of this construction, the punch can be easily attached to or detached from the ram, the punch, while being secured to the ram being held in correct axial alinement with its die by means of the punch guide sleeve 139 in the holder. The base of the holder may be provided with any suitable gage or stop means, such for example as have already been described.

In the construction shown in Figs. 13 and 14, the stripping of the punch from the work is effected by the upward movement of the slide member 124, which positively draws the punch upwardly out of the work, and the work is held down by the lower end of the punch guide sleeve. The guide sleeve 139 may be held against upward movement by the work X during the stripping operation by any suitable or desired means, such for example as a spring pressed pin 145 which slides through a hole in the arm 136 of the holder into another hole or annular groove 146 in the punch sleeve 139, the pin being easily withdrawn when it is desired to remove the guide sleeve 139.

Since with the type of stripper shown in Figs. 13 and 14, the upward or stripping movement of the punch may lift the holder, any suitable means are provided for preventing such upward movement of the holder. For example, the upper arm 122 may be provided with a downwardly extending projection 148, the lower face of which may engage a slightly raised pad or projection 149 of the arm 136 of the holder. When the holder is slid rearwardly of the table to its operative position, the pad 149 moves into engagement with the projection 148, thus securely holding the holder against rising during the stripping operation.

In Fig. 15. I have shown means of modified construction for returning the ram to its inoperative position. In this construction, the ram as in the other constructions shown is in the form of a lever having a longer arm 150 thereof connected with an actuating piston 151 arranged in the cylinder 152. Means of modified construction are provided for returning the lever arm 150 of the ram to its lower position, which include a second cylinder 154 positioned above the arm 150 of the ram, and a piston 155 is arranged in this cylinder. This piston has a downwardly extending piston rod 156 arranged so as to engage the upper face of the arm 150 of the ram. When fluid pressure is admitted to the cylinder 154 above the piston 155, the piston rod 156 will be forced downwardly, thus moving the arm 150 to its lower position. Means are preferably provided for limiting the upward movement of the arm 150 of the ram and by way of example, I have shown a stop screw 157 which extends through the head of the cylinder 154 so as to engage the upper face of the piston 155. 158 represents a lock nut engaging the stop screw 157 for locking the same in the desired position.

Since much less pressure is necessary to return the arm 150 of the ram to its lower position, the upper cylinder 154 may be of smaller diameter and its piston 155 is preferably actuated by the exhaust air or fluid from the ram actuating cylinder 152. Any suitable means may be provided for accomplishing this result and in Figs. 15 to 17, I have shown by way of example a valve which may be used for this purpose. This valve has a housing 160 in which a rotatable valve member 161 is provided. The housing of the valve is connected with a pipe 163 leading from a source of fluid pressure and the valve housing is connected by means of a pipe 164 with the ram actuating cylinder 152 and with a pipe 165 leading to the return cylinder 154. The valve housing 160 also connects with an exhaust or discharge pipe 166.

The movable valve member 161 is provided with passages 167 and 168. The passage 167 is so arranged in the valve member that when the same is in the position shown in Fig. 15, it connects the inlet pipe 163 with the pipe 164 leading to the ram actuating cylinder 152 and at the same time, the passage 168 connects the pipe 165 leading from the ram return cylinder 154 with the exhaust pipe 166. Consequently, fluid pressure actuates the piston 151 to move the ram through its working stroke and this motion also causes the piston 155 to be moved to its upper position.

After completion of the working stroke, the valve member 161 is turned either manually or by means of a treadle through about 90 degrees into the position shown in Fig. 16, in which the further supply of fluid under pressure from the inlet pipe 163 is interrupted and the pipe 164 leading to the ram operating cylinder 152 is connected through the passage 167 with the pipe 165 leading to the ram return cylinder 164. In this manner, the pressure acting on the two pistons 151 and 155 is equalized. The movable valve member 161 is then turned into the position shown in Fig. 17, in which the passage 167 of the valve connects the pipe 164 with the discharge or exhaust pipe 166 so that the remaining compressed fluid in the cylinder 152 is discharged to the exhaust. This permits the inner fluid pressure acting on the upper piston 155 to move the two pistons downwardly and thus return the ram to its inoperative position. Any other means for controlling the flow of fluid to the two cylinders may be employed, if desired.

My improved punching machine has hereinbefore been described solely for the purpose of punching circular holes in the work, but the machine may readily be used for punching non-circular holes. In Figs. 18 to 20, I have shown one form of this invention by means of which the machine may be employed for punching non-circular holes of any shape, such for example as an elongated slot 172. When non-circular holes are punched, the punch and die must be correctly located with reference to each other and must be held against rotation about their axis. The punch may be held against rotation in any suitable or desired manner, and in the construction illustrated this is accomplished by providing the punch guide sleeve 173 with a vertical spline or keyway 174 into which a key 175 enters. The key may be held in fixed relation to the arm 176 of the holder in any suitable manner, and in the construction shown, the upper and front faces of this arm may be recessed to receive the key and a downwardly extending leg or extension 178 thereof. This key may be held in place on the arm 176 in the recess provided therefor in any suitable manner, for example, by means of a screw 179. The key will, consequently, be held in fixed relation to the holder and the guide sleeve 173 will also be held in the desired angular relation to the arm 176, but will be free to move vertically. Since the lower end of the punch 179 is non-circular in cross section, the lower portion of the guide sleeve which guides the punch must have the bore or aperture therein of similar cross sectional shape so that the sleeve itself keeps the punch 179 from turning about the axis. Any other suitable means may be provided for holding the punch against turning about its axis.

The die 182 may also be held in accurate fixed relation to the base 183 of the holder by any suitable or desired means, and in the construction illustrated, the die 182 is provided with a spline or keyway extending throughout the length thereof into which a key 184 may enter. The base of the holder 183 adjacent to the aperture thereof in which the die 182 is received is also provided with a keyway so that the key 184 is arranged partly in each keyway, thus holding the die securely against rotation about its axis. This key may be held in place in any suitable manner, and in the construction shown, the key has an angular extension or part 185 adapted to fit into a recess in the bottom face of the base 183 and a screw 186 may serve to hold the key in place.

By means of the constructions described, the keys 175 and 184 may remain in place on the holder, and the die and punch assembly may be quickly removed from the holder and replaced by other punch and die units. For example, the die may be driven out of its position in the base by first moving the holder forward into the position shown in Figs. 15 and then striking the upper end of the punch with the hand as also shown in Fig. 15, and the punch guide sleeve and punch may be removed as a unit by pulling the same upwardly out of the hole in the arm 176. A different die and punch assembly may then be inserted in place on the holder. The keys may, if desired, be used with punches and dies for forming circular holes, or if it is not desired to hold the punches and dies against rotation, the keys 175 and 184 may readily be removed from the holder by removing the screws 179 and 186, whereupon the holder may be used with punches and dies as described in the preceding figures.

The punching machine described has the advantage that in work requiring a small number of perforations therein, this perforating of the work can be effected very easily and without fatiguing the operator, who sits in a natural position in front of the machine, and who can, for example, feed the work pieces from one side of the table to the perforating units and then place the finished work at the other side of the table. The ease and speed with which the punches and dies may be replaced by others plays an important part in the adaptability of the machine to punch holes of different sizes and to operate on work of different thicknesses. If two or more holes of different sizes are to be punched in a plurality of work pieces in different locations thereon, the machine can be operated to first punch one of the series of holes in each work piece with one setting or adjustment of the parts of the machine. When this has been done, the machine may be adjusted, for example, by different setting of the gage and, if necessary, by inserting another punch and die in the machine for punching the next series of holes in the work pieces. When a series of holes of the same diameter are to be punched in the work, the gage devices with movable stop members 111 thereon, as shown in Figs. 10 and 11, may be advantageously employed for placing the work successively in different positions.

While in the drawings I have only shown flat work pieces, yet it will be obvious that the machine described is so constructed that ample clearance can be provided between the base 55 and arm 56 of the holder so that the machine can be used for forming perforations in formed or shaped pieces of many different kinds.

It is also an important feature of this invention that the changing of the machine to punch holes of different sizes or shapes, or to punch holes in different thicknesses of material is greatly facilitated by the rack containing the various punches and dies of different sized holes for different thicknesses of material arranged methodically on the rack in definite relation to each punch. The machine, consequently, lends itself to exceptionally quick and efficient punching of holes in certain kinds of work.

I claim as my invention:

1. A punching machine having a bed and a ram, a holder supported on said bed and having a base and an arm spaced to receive work between them, and perforating units removably mounted on said arm and said base of said holder, and guide means relatively to which said holder is movable relatively to said bed out of operative relation to said ram, to enable said holder to be moved into an operative position in which said perforating units are positioned to be operated on by said bed and ram, and into an inoperative position in which said perforating units may be removed from said holder while said holder is supported on said bed.

2. A punching machine having a bed and a ram, a holder supported on said bed and having a base and an arm spaced to receive work between them, perforating units removably mounted on said arm and said base of said holder near one end of said holder, guide means on which said holder is movable in the direction of its length relatively to said bed to enable said end of said holder to be moved into an operative position in which said perforating units are positioned to be operated on by said bed and ram, and into an inoperative position in which said perforating units may be removed from said holder while the same is supported on said bed.

3. A punching machine having a bed and a ram, a holder supported on said bed and having a base and an arm spaced to receive work between them, perforating units removably mounted on said arm and said base of said holder, said holder being movable relatively to said bed to enable said holder to be moved into an operative position in which said perforating units are positioned to be operated on by said bed and ram, and into an inoperative position in which said perforating units may be removed from said holder, and a sliding connection between said holder and said machine along which said holder may be slid into operative position and into a position in which said perforating units may be removed therefrom while said holder is supported on said bed.

4. A punching machine having a bed and a ram movable toward and from the bed, a holder slidably mounted on the machine and having a base supported by said bed and an arm spaced from said base and from said ram, means on said holder for supporting a die unit, and a punch unit, one of said units being mounted on said base, and the other unit being mounted on said arm in alinement with the other unit and movable toward and from said other unit, a guideway on said machine on which said holder is slidable into a position in which said movable unit can be actuated by said ram for perforating the work, and into another position in which said punch and die units may be removed from said holder and replaced by other units while said holder is supported on said bed.

5. A punching machine in accordance with claim 1, and including adjustable gage means for locating the work relatively to the perforating elements, and mounted on said holder.

6. A punching machine including a punch press housing having a part thereof forming a bed and an upper housing part extending over said bed, a ram mounted in said housing part and having a portion thereof movable toward and from said bed, a table secured upon said bed and extending to opposite sides thereof, said table having a recess formed therein and extending between said bed and said ram, a holder slidable in said recess, punch and die units mounted in said holder for cooperation with each other, said holder being movable in said recess into an operative position in which said punch and die units are between said ram and said base, and into an inoperative position in which said punch and die units are arranged beyond said table to permit removal thereof from said holder, and means for actuating said ram.

7. A punching machine including a punch press housing having a part thereof forming a bed and an upper housing part extending over said bed, a ram mounted in said housing part and having a portion thereof movable toward and from said bed, a table secured upon said bed and extending to opposite sides thereof, said table having a recess formed therein and extending between said bed and said ram, a holder slidable in said recess, punch and die units slidably mounted on said holder for movement toward and from each other, one of said units resting on said punch press bed when said holder is in its operative position and the other unit being arranged to be moved by said ram toward said first mentioned unit, said holder also being movable into a position in which said first mentioned unit is beyond said table for removal from said holder, and means for actuating said ram.

8. A punching machine including a punch press housing having a part thereof forming a bed and an upper housing part extending over said bed, a ram mounted in said housing part and having a portion thereof movable toward and from said bed, a table secured upon said bed and extending to opposite sides thereof, said table having a recess formed therein and extending between said bed and said ram, a holder slidable in said recess, punch and die units slidably mounted on said holder for cooperation with each other, said die unit resting on said punch press bed when said holder is in its operative position and said punch unit being arranged to be moved by said ram toward said die unit, said holder being slidable in said recess into a position in which said die unit is beyond said table for removal from said holder and in which said punch unit may be removed from said holder, and means for actuating said ram.

9. A punching machine including a press housing having a bed and an upper housing part arranged in spaced relation to said bed, and an intermediate portion connecting one end of said bed with one end of said upper housing part, a ram in the form of a lever located in said upper housing part and pivoted thereto, a power actuated member mounted on said press and connected with one arm of said lever for swinging the same, a holder slidably supported on said bed, perforating units mounted on said holder, and a slideway on which said holder is movable into an operative position in which one of said perforating units is arranged in position to be actuated by the other arm of said lever and in which the major portion of said holder is under said lever, and into an inoperative position in which said units may be removed from said holder while said holder is supported on said bed.

10. A punching machine according to claim 9 and in which the power actuated member includes a cylinder mounted on the bed of said press, and a piston in said cylinder connected with one arm of said lever.

11. A punching machine having a bed and a ram movable toward and from the bed, a holder slidably mounted on the machine and having a base supported by said bed and an arm spaced from said base and from said ram, a die mounted on said base and having a hole terminating in the bottom thereof for the discharge of punchings, and a punch mounted in said arm and movable toward and from said die, said holder being slidable into an operative position in which said punch is in operative relation to said ram, said bed being provided with a hole therein which when said holder is in its operative position, is in registration with said hole in said die and through which punchings may be discharged from said die.

12. A punching machine including a punch press housing having a part thereof forming a bed and an upper housing part extending over said bed, a ram mounted in said housing part and having a portion thereof movable toward and from said bed, a table secured upon said bed and extending to opposite sides thereof, said table having a recess formed therein and extending between said bed and said ram, a holder including a base and an arm extending in spaced relation thereto, said base being slidable in said recess, a die mounted on said base and having a hole extending therethrough and terminating in the bottom thereof for the discharge of punchings, and a punch mounted in said arm and guided by said arm for movement toward and from said die, said holder being slidable in said recess into an operative position in which said punch is in position to be moved toward said die by said ram, said table and bed being provided with holes which are in registration with said hole in said die when said holder is in operative position.

13. A punching machine including a punch press housing having a part thereof forming a bed and an upper housing part extending over said bed, a ram mounted in said housing and having a portion thereof movable toward and from said bed, a table secured upon said bed and extending to opposite sides thereof, said table having a recess formed therein and extending between said bed and said ram, a holder including a base and an arm extending in spaced relation thereto, said base being slidable in said recess, a die mounted on said base and having a hole extending therethrough and terminating in the bottom thereof for the discharge of punchings, a punch mounted in said arm and guided by said arm for movement toward and from said die, said holder being slidable in said recess into an operative position in which said punch is in position to be moved toward said die by said ram, said table and bed being provided with holes which are in registration with said hole in said die when said holder is in operative position, and an insert of hard metal arranged about said hole in said table and on which said die seats when said holder is in its operative position.

14. A punching machine having a bed and a ram, a holder supported on said bed and having a base and an arm spaced to receive work between them, perforating units removably mounted on said arm and said base of said holder, said holder being movable relatively to said bed to enable said holder to be moved into an operative position in which the perforating unit mounted on said arm is in position to be actuated by said ram, and a plate of hard material supported by said bed and with which the other of said perforating units engages when said holder is in operative position.

15. A punching machine including a punch press housing having a part thereof forming a bed and an upper housing part extending over said bed, a ram mounted in said housing part and having a portion thereof movable toward and from said bed, a table secured upon said bed and extending to opposite sides thereof, said table having a recess formed therein and extending between said bed and said ram, a holder slidable in said recess, punch and die units mounted in said holder for cooperation with each other, said holder being movable in said recess into an operative position in which one of said units is in position to be actuated by said ram, and an insert of hard metal in said table in position to be engaged by the other of said units when the holder is in its operative position.

16. In a punching machine having a bed and a ram movable toward and from said bed, a holder for a punch and a die, said holder having a base provided with a hole extending through said base and adapted to receive a die, said holder also having an arm spaced from said base and removably supporting a punch in operative relation to said die, and means for guiding said holder into a position in which said punch is in operative relation to said ram, and in which said die is supported in said hole in said base by said bed, and into another position in which said die may drop out of said hole in said base.

17. In a punching machine having a bed and a ram movable toward and from said bed, a holder for a punch and a die, said holder having a base slidable on said machine and having a hole extending through said base and adapted to receive a die, said holder also having an arm spaced from said base and removably supporting a punch in operative relation to said die, and means for guiding said holder into a position in which said punch is in operative relation to said ram, and in which said die is supported in said hole in said base by said bed, and into another position in which said die may drop out of said hole in said base, said bed having a hole extending through the same and through which punchings from said die may pass when said holder is in its operative position.

18. In a punching machine having a bed and a ram movable toward and from said bed, a holder for a punch and a die, said holder having a base slidable on said machine and having a hole extending through said base, and adapted to receive a die, said holder also having an arm spaced from said base and removably supporting a punch in operative relation to said die, means for guiding said holder into a position in which said punch is in operative relation to said ram, and in which said die is supported in said hole in said base by said bed, and into another position in which said die may drop out of said hole in said base, and a pad of hard metal on which said die rests when said holder is in its operative position, said pad and said bed having registering holes extending therethrough and through which punchings from said die may be discharged from said machine.

19. In a punching machine having a bed and a ram movable toward and from said bed, a holder having a base and an arm arranged in spaced relation thereto to permit work to be placed between said base and arm, punch and die units mounted on said base and arm in operative relation to each other, said machine having a recess extending toward the front of the machine and in which the base of said holder is slidable to position said punch and die units in operative relation to said ram when said holder is slid rearwardly in said recess, gage means including a guide member mounted on said base for adjustment lengthwise thereof while maintaining a fixed angular relation to said base, and means for releasably clamping said guide member on said base.

20. In a punching machine having a bed and a ram movable toward and from said bed, a holder having a base and an arm arranged in spaced relation thereto to permit work to be placed between said base and arm, punch and die units mounted on said base and arm in operative relation to each other, said machine having a recess in which the base of said holder is slidable to position said punch and die units in operative relation to said ram, gage means including a guide member mounted on said base for adjustment lengthwise thereof while maintaining a fixed angular relation to said base, means for releasably clamping said guide member on said base, and a gage member adapted to be engaged by two edges of the work and adjustable relatively to said guide member in a direction transversely of said base.

21. In a punching machine having a bed and a ram movable toward and from said bed, a holder having a base and an arm arranged in spaced relation thereto to permit work to be placed between said base and arm, punch and die units mounted on said base and arm in operative relation to each other, said holder being movable on said machine into and out of position in which said punch and die units are in operative relation to said ram, a gage member having a part extending transversely of said holder and adapted to be engaged by one edge of the work, and another part arranged in position to be engaged by another edge of the work, and means for adjustably securing said gage member to said holder.

22. A gage for use on a punching machine having a punch and die arranged in operative relation to each other, said gage including a gage bar adjustable relatively to said punch and die, both in the direction of its length and transversely thereof, means for clamping said gage bar in fixed relation to said punch and die for engagement with an edge of the work, and an arm rigidly secured on said gage bar and extending outwardly therefrom into position to engage another edge of the work.

23. A gage for use on a punching machine having a punch and die arranged in operative relation to each other, said gage including a gage bar adjustable relatively to said punch and die, means for clamping said gage bar in fixed relation to said punch and die for engagement with an edge of the work, and a plurality of gage members each of which is mounted on said gage bar to swing into a position to engage another edge of the work and into another position above the work in which the work will pass under said gage member, and a groove on said gage bar in which said gage members are removably held in contact with each other.

24. A gage for use on a punching machine having a punch and die arranged in operative relation to each other, said gage including a gage bar adjustable relatively to said punch and die, means for clamping said gage bar in fixed relation to said punch and die for engagement with an edge of the work, and a plurality of movable gage members of predetermined widths slidable lengthwise of said gage bar and abutting one against the other and adapted to be moved into positions to engage another edge of the work, whereby the work may be slid along said bar into a plurality of positions in engagement with different gage members, for forming a plurality of accurately spaced holes in the work.

25. An punching machine including a bed, a ram movable toward and from said bed, a holder having a cooperating pair of perforating units removably mounted thereon in operative relation to each other, said holder being guided for movement in a predetermined path relatively to said bed to move said perforating units into operative relation to said ram, and into an inoperative position in which said perforating units can be removed from said holder, and means for detachably connecting one of said perforating units with said ram during the movement of said holder into its operative position to cause said perforating unit to be moved by said ram into and out of operative relation to the other perforating unit.

26. A punching machine including a bed, a ram movable toward and from said bed, a holder having a cooperating pair of perforating units removably mounted thereon in operative relation to each other, said holder being guided for movement in a predetermined path relatively to said bed to move said perforating units into operative relation to said ram, and into an inoperative position in which said perforating units can be removed from said holder, a jaw on said ram, and a part on one of said perforating units adapted to enter said jaw when said holder is moved along said path into operative relation to said ram, for connecting said perforating unit with said ram to enable the ram to move said perforating unit toward and from the other perforating unit.

27. A punching machine including a bed, a ram movable toward and from said bed, a holder having a punch and a die mounted thereon, in operative relation to each other, a guideway in which said holder is slidable in the direction of its length on said bed into and out of an operative position in which said punch is in position to be actuated by said ram, and a part on said punch which is movable into interlocking engagement with said ram when said holder is moved into its operative position.

28. A punching machine including a bed, a ram movable toward and from said bed, a holder having a punch and a die mounted thereon in operative relation to each other, a guideway in which said holder is slidable in the direction of its length on said bed into and out of an operative position in which said punch is in position to be actuated by said ram, a jaw on said ram, and a part on said punch which is movable into interlocking engagement with said jaw when said holder is moved on said guideway into its operative position and which moves out of engagement with said jaw when said holder is moved out of said operative position.

29. A punching machine having a bed and a ram movable toward and from the bed, a holder slidably mounted on the machine and having a base supported by said bed and an arm spaced from said base and from said ram, means on said holder for removably supporting a die on said base and a punch on said arm in alinement with the die, and movable toward and from said die, said holder being slidable into an operative position in which said punch can be actuated by said ram for perforating the work, and into another position in which said punch and die may be removed from said holder and replaced by another punch and die, and cooperating parts on said ram and said punch which become engaged when said holder is moved into its operative position to cause said punch to be reciprocated by said ram, and which become disengaged when said holder is moved into an inoperative position.

30. A quick change hole punching machine comprising a stationary frame including a bed, a power driven ram mounted on said frame and movable toward and from said bed, a holder having a lower base and upper arm spaced to receive the work between them, a die unit in said base, a punching device under said ram and mounted on said upper arm in coaxial relation to said die unit, said punching device and die unit being freely replaceable with other punching devices and die units for punching different sizes of holes and different thicknesses of materials, and a guide track in which said holder is slidable into an operative position in which said punching device is in operative relation to said ram, and into an inoperative position in which said punching device and die unit are removable without removing said holder from said bed.

31. A quick change individual hole punching machine comprising a stationary frame including a bed, a power driven ram on said frame movable toward and from said bed, a holder having a lower base and upper arm spaced to receive the work between them, a die unit in said base adjacent to one end thereof, a punching device under said ram and mounted on said upper arm in coaxial relation to said die unit, a guideway in which said holder is movable relatively to said bed into an operative position in which said punching device is in position to be actuated by said ram, and into an inoperative position, in which said end of said base extends beyond an edge of said bed, said punching device and die unit being freely replaceable with other punching devices and die units for punching different sizes of holes or different thicknesses of materials when said holder is in said inoperative position, and adjustable work gaging means attached to said holder and movable therewith in fixed relation to said punching device when said holder is moved from one position to another.

32. A punching machine having a bed and a ram, a holder supported on said bed and having a base and an arm spaced to receive work between them, perforating units removably mounted on said arm and said base of said holder, said holder being movable relatively to said bed to enable said holder to be moved into an operative position in which said perforating units are positioned to be operated on by said bed and ram, and into an inoperative position in which said perforating units may be removed from said holder, means on said base for securing one of said perforating units in fixed relation thereto, and means on said arm for guiding the other perforating unit into oriented relation to said perforating unit on said base for punching non-circular holes.

33. A quick change hole punching machine comprising a stationary frame including a bed, a power driven ram mounted on said frame and movable toward and from said bed, a holder having a lower base and upper arm spaced to receive the work between them, a die unit in said base, a punching device under said ram and mounted on said upper arm in coaxial relation to said die unit, a guideway on which said holder is movable into and out of operative relation to said ram, said punching device and die unit being freely replaceable with other punching devices and die units for punching different sizes of holes and different thicknesses of materials, when said holder is moved into an inoperative position on said guideway, means on said holder for securing a die in fixed relation thereto, and means on said arm for guiding said punching device into correctly oriented relation to said die for punching non-circular holes.

34. A device for use in punching non-circular holes in sheet material, including a holder having a base and an arm extending over the base, said base and arm being spaced from each other to receive the work between them and having axially alined apertures to receive a die unit and a punching device, said punching device including a punch unit and a guide and stripping sleeve therefor relatively to which said punch may move axially, a key for guiding said die in one of said apertures into fixed relation to said holder, and a key for guiding said guide sleeve into oriented relation to said die.

35. A punching machine having a bed and a ram, a holder supported on said bed and having a base and an arm spaced to receive work between them, perforating units removably mounted on said arm and said base of said holder, a guideway in which said holder is movable in the direction of its length relatively to said bed to enable said holder to be moved into an operative position in which said perforating units are positioned to be operated on by said bed and ram, and into an inoperative position in which said perforating units may be removed from said holder, the perforating unit of the base of said holder being supported by said bed when said holder is in operative position and when said ram moves through its working stroke, whereby the stresses resulting from perforating the work do not pass through said holder.

36. In a punching machine having a bed and a ram movable toward and from said bed, a holder having a base and an arm arranged in spaced relation thereto to permit work to be placed between said base and arm, punch and die units mounted on said base and arm in operative relation to each other, and a table mounted on said bed and having a groove formed to receive said base of said holder with the top of said base substantially flush with the top of said table, said holder being slidable rearwardly in said groove into a position in which said punch and die units are in operative relation to said ram and forwardly in which said punch and die units can be removed from said holder.

37. A punch and die holder for use on a machine having a bed and a ram, said holder having a base and an arm extending over said base in spaced relation thereto to permit work to be inserted between said base and arm, punch and die units mounted on said base and said arm to punch the work when actuated by said ram, a gage bar adjustably mounted on said base and with which one edge of the work may engage, and a plurality of gage devices mounted on said gage bar and adapted to engage another edge of the work to position the same relatively to said punch and die units, said gage devices having work engaging parts normally resiliently held out of the path of movement of the work along said gage bar and adapted to be moved into positions to engage the work.

38. A punching machine including a press housing having a bed and an upper housing part arranged in spaced relation to said bed, and an intermediate portion connecting one end of said bed with one end of said upper housing part, a ram in the form of a lever located in said upper housing part and pivoted thereto, a cylinder and piston for moving said ram through its working stroke and actuated by compressed gas, another cylinder and piston for returning said ram to its starting position, means for conducting exhaust gas from said first cylinder after the working stroke of its piston to said other cylinder to return said ram, and a punch and die holder movable into and out of operative relation to said ram.

GEORGE F. WALES.